(12) United States Patent
Pilarinos et al.

(10) Patent No.: US 10,012,490 B1
(45) Date of Patent: Jul. 3, 2018

(54) DETERMINING LOCATION OR POSITION OF A PORTABLE ELECTRONIC DEVICE

(71) Applicant: Amazon Technologies, Inc., Seattle, WA (US)

(72) Inventors: Dennis Pilarinos, Vancouver (CA); Xiangwen (Shane) Li, Vancouver (CA); Jia (Ken) Li, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 589 days.

(21) Appl. No.: 14/495,603

(22) Filed: Sep. 24, 2014

Related U.S. Application Data

(60) Provisional application No. 62/012,891, filed on Jun. 16, 2014.

(51) Int. Cl.
*G06F 3/0346* (2013.01)
*G06F 3/0338* (2013.01)
*G01B 5/00* (2006.01)
*G01P 15/14* (2013.01)

(52) U.S. Cl.
CPC ............... *G01B 5/00* (2013.01); *G01P 15/14* (2013.01)

(58) Field of Classification Search
CPC ................... G06F 3/0346; G06F 3/017; G06F 2200/1637; A61B 2562/0219; A63B 24/0062; H04M 2250/12; G01C 21/165
USPC .......... 345/158; 702/141, 150, 189; 715/764
See application file for complete search history.

(56) References Cited

U.S. PATENT DOCUMENTS

| 2009/0170532 | A1* | 7/2009 | Lee | H04M 1/72566 455/456.3 |
| 2013/0046489 | A1* | 2/2013 | Keal | G01R 33/02 702/57 |
| 2013/0063360 | A1* | 3/2013 | Dods | G06F 1/1694 345/169 |
| 2013/0155264 | A1* | 6/2013 | Zhou | H04N 5/23267 348/208.6 |
| 2013/0190903 | A1* | 7/2013 | Balakrishnan | A61B 5/7246 700/91 |
| 2013/0191034 | A1* | 7/2013 | Weast | G06F 17/00 702/19 |
| 2013/0245966 | A1* | 9/2013 | Burroughs | G06F 19/3481 702/44 |
| 2013/0328935 | A1* | 12/2013 | Tu | G06F 1/1694 345/651 |

(Continued)

*Primary Examiner* — Roy Y Yi
*Assistant Examiner* — Jeffrey Aiello
(74) *Attorney, Agent, or Firm* — Lee & Hayes, PLLC

(57) ABSTRACT

Subject matter disclosed herein relates to arrangements and techniques that provide for determining a location and/or position of a portable electronic device in order to control features and/or modes of operation of the portable electronic device. A method comprises determining, via the portable electronic device, positional measurement values related to the portable electronic device, determining an absolute value of a difference between a first positional measurement value and a second positional measurement value, and determining an average of absolute values of multiple differences. The average is compared with a threshold. If the average exceeds the threshold, a first mode of operation of the portable electronic device is triggered, and if the average is below the threshold, a second mode of operation of the portable electronic device is triggered.

20 Claims, 2 Drawing Sheets

(56) References Cited

U.S. PATENT DOCUMENTS

| | | | |
|---|---|---|---|
| 2015/0039310 A1* | 2/2015 | Clark | G10L 15/063 |
| | | | 704/244 |
| 2017/0228242 A1* | 8/2017 | Rothkopf | G06F 9/44505 |
| 2017/0234691 A1* | 8/2017 | Abramson | G01C 21/3641 |
| | | | 701/442 |

* cited by examiner

DETERMINING LOCATION OR POSITION OF A PORTABLE ELECTRONIC DEVICE

CROSS REFERENCE TO RELATED APPLICATIONS

This claims priority to U.S. Provisional Patent Application No. 62/012,891, filed on Jun. 16, 2014, which is incorporated herein by reference.

BACKGROUND

Portable electronic devices such as, for example, smart phones, mobile phones, tablet computers, notebook computers, laptop computers, and other similar computing devices, generally have various modes of operation. During the various modes of operation, various features of a portable electronic device may or may not be available to a user of the portable electronic device. For example, in various modes of operation, the portable electronic device may enter a "sleep" mode or a lower power mode in order to conserve power.

Sometimes it is desirable to have the portable electronic device change modes of operation based upon location or position of the portable electronic device. For example, if the portable electronic device is in a user's hand and is being moved around, this can indicate that the portable electronic device is being used. However, if the portable electronic device is placed on a stable interface such as, for example, a table, then after an amount of time, it may be that the portable electronic device is not being used. Thus, if the portable electronic device is not being used, it may be desirable to change modes of operation of the portable electronic device such that various features and/or functions may be available to the user or such that various features and/or functions are not available to the user.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1:
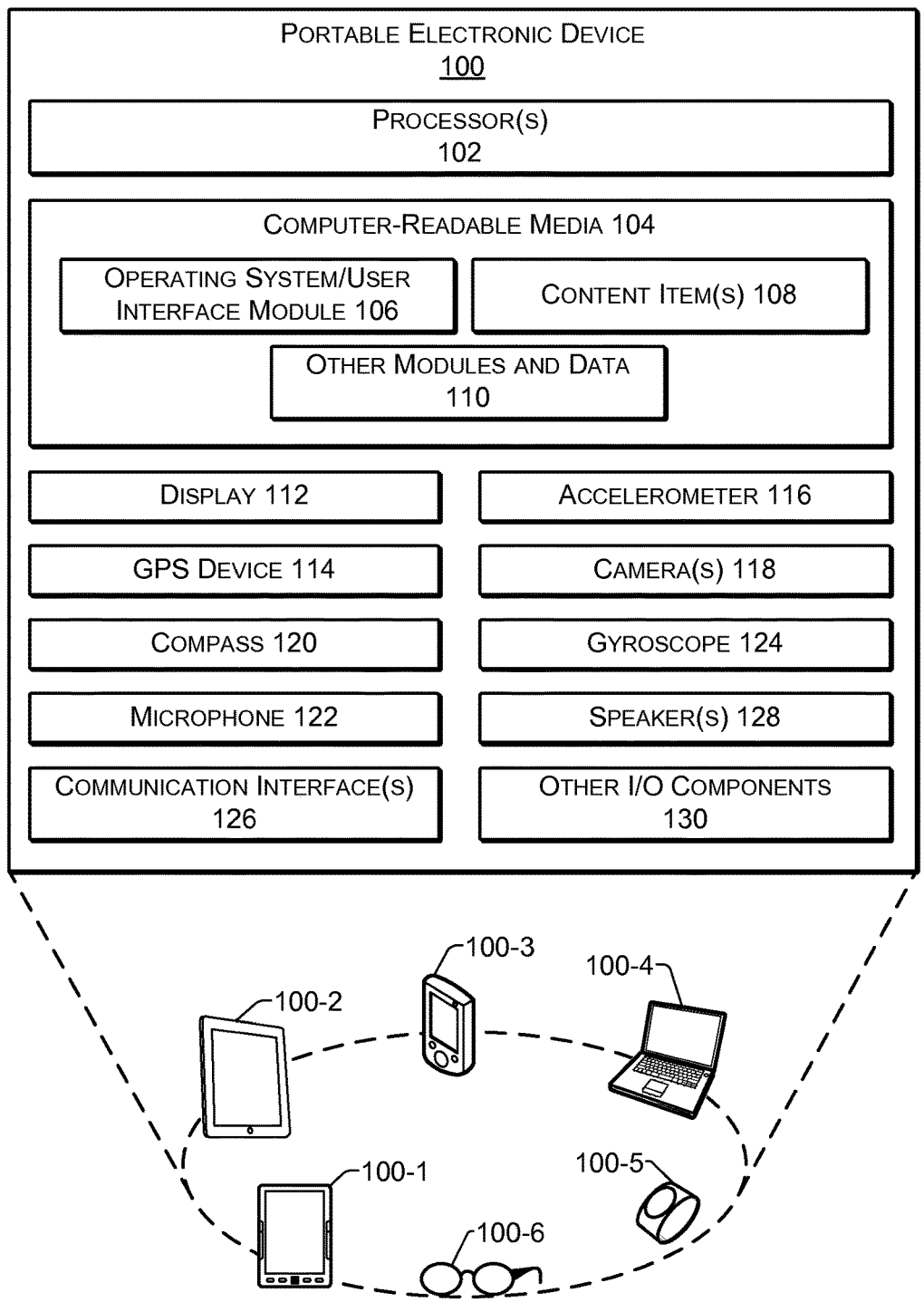
FIG. 1 illustrates select components of an example portable electronic device that includes a gyroscope, in accordance with various embodiments.

The present disclosure provides arrangements and techniques for determining a location and/or position of a portable electronic device in order to control features and/or modes of operation of the portable electronic device.

In general, portable electronic devices, including, but not limited to, smart phones, mobile phones, portable computing devices, tablet computers, laptop computers, notebook computers, personal digital assistants (PDAs), and portable media devices (e.g., e-book devices, DVD players, etc.), include various features and functions and are capable of operating in various modes. Sometimes, it is desirable to have certain features and/or functions enabled or disabled depending upon the location or position of the portable electronic device. Likewise, sometimes, it may be desirable to change a mode of operation of the portable electronic device depending upon the location or position of the portable electronic device In accordance with various embodiments, a portable electronic device includes a gyroscope that can be used to determine movement of the portable electronic device. It has been determined that the gyroscope's raw readings generally will not converge around a zero axis immediately upon placement of the portable electronic device on a stable interface. Rather, the gyroscope's raw readings will converge and settle but at values above the zero axis. Accordingly, in accordance with various embodiments, differences with respect to the gyroscope's readings analyzed via a hysteresis loop can be utilized to determine movement of the portable electronic device. As is known, hysteresis is the dependence of the output of a system not only on its current input, but also on the system's history of past inputs. The analysis can be utilized to determine a location or position of the portable electronic device.

More particularly, absolute values of the gyroscope's readings are summed. Generally, there are readings for an X direction (X axis), a Y direction (Y axis) and a Z direction (Z axis), i.e. there are three-dimensional readings. The summation of the absolute individual gyroscope readings can be placed into an array or window. A difference measurement is then calculated, which is the absolute value of the difference between a current reading and a previous reading. In general, the previous reading is usually an immediately preceding reading. The calculated difference measurements are placed into an array and an average of the difference measurements is calculated. Thus, a history of the gyroscope readings is used to determine a location or position of the portable electronic device.

The average of the difference measurements is then compared to one or more thresholds. In accordance with various embodiments, if the average is greater than a first threshold, then a first mode of operation is triggered for the portable electronic device. If the average is less than a second threshold, then a second mode of operation for the portable electronic device is triggered. The readings of the gyroscope and averages can be calculated and the changes can be noted within fractions of seconds.

In accordance with various embodiments, the difference measurements are utilized and compared using the hysteresis loop such that the threshold to change modes of operation for the portable electronic device is generally large. In general, switching between modes is not symmetric. This can help prevent frequently switching back and forth between modes of operations when such switching is not necessary. In general, a substantial change with regard to the average of difference measurements of the gyroscope readings is needed to change modes of operation.

FIG. 1 illustrates select example components of an example portable electronic device 100. The portable electronic device 100 may be implemented as any of a number of different types of electronic devices. Some examples of the portable electronic device 100 may include digital media devices and eBook readers 100-1; tablet computing devices 100-2; smart phones, mobile devices and portable gaming systems 100-3; laptop and netbook computing devices 100-4; wearable computing devices 100-5; augmented reality devices, helmets, goggles or glasses 100-6; etc. This list is only an example and is not meant to be limiting.

In a very basic configuration, the portable electronic device 100 includes, or accesses, components such as at least one control logic circuit, central processing unit, or processor 102, and one or more computer-readable media 104. Each processor 102 may itself comprise one or more processors or processing cores. For example, the processor 102 can be implemented as one or more microprocessors, microcomputers, microcontrollers, digital signal processors, central processing units, state machines, logic circuitries, and/or any devices that manipulate signals based on operational instructions. In some cases, the processor 102 may be one or more hardware processors and/or logic circuits of any suitable type specifically programmed or configured to execute the algorithms and processes described herein. The processor 102 can be configured to fetch and execute computer-readable instructions stored in the computer-readable media 104 or other computer-readable media.

Depending on the configuration of the portable electronic device 100, the computer-readable media 104 may be an example of tangible non-transitory computer storage media and may include volatile and nonvolatile memory and/or removable and non-removable media implemented in any type of technology for storage of information such as computer-readable instructions, data structures, program modules or other data. The computer-readable media 104 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the portable electronic device 100 may access external storage, such as RAID storage systems, storage arrays, network attached storage, storage area networks, cloud storage, or any other medium that can be used to store information and that can be accessed by the processor 102 directly or through another computing device or network. Accordingly, the computer-readable media 104 may be computer storage media able to store instructions, modules or components that may be executed by the processor 102.

The computer-readable media 104 may be used to store and maintain any number of functional components that are executable by the processor 102. In some implementations, these functional components comprise instructions or programs that are executable by the processor 102 and that, when executed, implement operational logic for performing actions as described herein. Functional components of the portable electronic device 100 stored in the computer-readable media 104 may include an operating system/user interface module 106 for controlling and managing various functions of the portable electronic device 100.

In addition, the computer-readable media 104 may also store data, data structures and the like, that are used by the functional components. For example, data stored by the computer-readable media 104 may include user information and, optionally, one or more content items 108. Depending on the type of the portable electronic device 100, the computer-readable media 104 may also optionally include other functional components and data, such as other modules and data 110, which may include programs, drivers and so forth, and the data used by the functional components. Further, the portable electronic device 100 may include many other logical, programmatic and physical components, of which those described are merely examples that are related to the discussion herein. Further, while the figures illustrate the functional components and data of the portable electronic device 100 as being present on the portable electronic device 100 and executed by the processor 102 on the portable electronic device 100, it is to be appreciated that these components and/or data may be distributed across different computing devices and locations in any manner.

FIG. 1 further illustrates other components of the example of the portable electronic device 100. Such examples include a display 112 and various types of sensors, which may include a GPS device 114, an accelerometer 116, one or more cameras 118, a compass 120, a microphone 122, and so forth. In accordance with various embodiments, the portable electronic device 100 includes a gyroscope 124.

The portable electronic device 100 may further include one or more communication interfaces 126, which may support both wired and wireless connection to various networks, such as cellular networks, radio, Wi-Fi networks, close-range wireless connections, near-field connections, infrared signals, local area networks, wide area networks, the Internet, and so forth. The communication interfaces 126 may further allow a user to access storage on or through another device, such as a remote computing device, a network attached storage device, cloud storage, or the like.

The portable electronic device 100 may further be equipped with one or more speakers 128 and various other input/output (I/O) components 130. Such I/O components 130 may include a touchscreen and various user controls (e.g., buttons, a joystick, a keyboard, a keypad, etc.), a haptic or tactile output device, connection ports, physical condition sensors, and so forth. For example, the operating system 106 of the portable electronic device 100 may include suitable drivers configured to accept input from a keypad, keyboard, or other user controls and devices included as the I/O components 130. The display 112 may be configured as a touchscreen or the portable electronic device 100 may include a separate touchscreen. The processor 102 can perform one or more functions attributed to a graphic controller (not illustrated) for the display 112. Functional components of the portable electronic device 100 stored in the computer-readable media 104 may include the user interface module 106 for controlling and managing various functions of the portable electronic device 100, and for generating one or more user interfaces on the display 112 of the portable electronic device 100. Additionally, the portable electronic device 100 may include various other components that are not illustrated, examples of which include removable storage, a power source, such as a battery and power control unit, a PC Card component, and so forth.

As previously noted, the portable electronic device 100 includes a gyroscope 124. The gyroscope 124 can be used to sense movement of the portable electronic device 100. For example, the gyroscope 124 can be used to determine a location and/or a position of the portable electronic device 100 such as, for example, whether the portable electronic device 100 is located in a user's hand, and thus moving, or if the portable electronic device 100 is located on a stable surface such as, for example, a table top, a countertop, a desk top, etc. In general, if the portable electronic device 100 is being held in a user's hand, the gyroscope 124 will detect at least a little bit of movement because the user's hand cannot hold the portable electronic device 100 absolutely still.

When a user is holding the portable electronic device in their hand, it is very likely that the user is using the portable electronic device 100. Conversely, if the portable electronic device 100 is placed on a stable surface, then there may be a good chance that the user is not using the portable electronic device 100. Thus, depending upon the location of the portable electronic device 100, various modes of operation and/or features for the portable electronic device 100 may be desirable or not desirable to the user. For example, when the user is using the portable electronic device 100, then it is desirable to have a mode of operation be an active mode of operation. However, if the portable electronic device 100 is located on a stable surface, it may be desirable to have a mode of operation be a "sleep" or low power mode of operation for the portable electronic device 100 if the portable electronic device 100 is not being used by the user.

Additionally, it may be desirable to have certain features and/or functions of the portable electronic device 100 enabled or disabled during modes of operation of the portable electronic device 100 depending upon the location or position of the portable electronic device 100. For example, the portable electronic device 100 may be configured with an auto-scrolling feature. Auto-scrolling generally refers to scrolling of text and/or images on a display, generally a touchscreen, that occurs automatically. If the user is holding the portable electronic device 100 in their hand, then the auto-scrolling feature may be desirable. However, if the portable electronic device 100 is placed on a stable surface, then the auto-scrolling feature may not be desirable as the user may wish to use a finger or some other device to manually scroll items displayed on the display 112. Also, as another example of a feature, if a user is holding the portable electronic device 100 in their hand and watching a video on the display 112, the video may be displayed in a low resolution mode of the display 112, a small view on the display 112, etc. However, if the user places the portable electronic device 100 on a stable surface, then this may be an indication that the user is very interested and intently watching the video and thus, it may be desirable to display the video in a high resolution mode of the display 112, a larger or full view on the display 112, etc. Other features and/or functions may also be enabled or disabled depending upon the location or position of the portable electronic device 100.

In accordance with various embodiments, the gyroscope 124 can be used to determine if the portable electronic device 100 is moving or is resting on a stable surface. Measurements from the gyroscope generally include a measurement in three directions, i.e., the X axis, the Y axis, and the Z axis. In accordance with various embodiments, the absolute value of each measurement for each axis is summed into a measurement value M and stored into an array. An absolute value of a difference D between a current measurement value $M_t$ and a previous measurement value, generally the immediately preceding measurement $M_{t-1}$, is determined and stored into another array. An average of the stored differences D is then determined and whenever the average of the stored differences D exceeds one of two thresholds, then it can be determined that the portable electronic device 100 is either being held in a user's hand, or is located on a stable surface. Thus, a hysteresis loop using a history of the gyroscope readings is used to determine a change in the location or position of the portable electronic device 100. Generally, the measurements, averages and comparisons can be calculated and the changes can be noted within fractions of seconds. In accordance with various embodiments, the average of the differences D can be compared to one threshold or to more than two thresholds if desired.

Generally, the threshold to change modes of operation for the portable electronic device 100 is relatively large. In general, switching between modes of operation is not symmetric. This can help prevent frequently switching back and forth between modes of operation when such switching is not necessary. In general, a substantial change with regard to the average of the differences D of the gyroscope readings is needed to change modes of operation. As an example, if the average of differences D is less than 175, thereby indicating that movement of the portable electronic device 100 is low, then it may be determined that the portable electronic device 100 is located on a stable surface; and if the average of the differences D is greater than 500, thereby indicating a greater amount of movement of the portable electronic device 100, then it may be determined that the portable electronic device 100 is located in a user's hand. Depending upon the determination, the portable electronic device 100 can then operate in one of either a stable surface mode or a handheld mode and thus, various features and/or modes of operation may be activated or deactivated.

In accordance with various embodiments, the number of sample differences D to determine an average of the differences is 24. A greater number or fewer number of differences D may be utilized in order to calculate the average of the differences if desired. In general, the arrays into which the measurement values M and the differences D are stored are sliding windows and thus, a new measurement value M and a new difference D are stored into the respective arrays and cause the oldest measurement value M and the oldest difference D to be dropped from the respective arrays.

An example of performing the various operations with Java code includes:

Sum up absolute sensor readings: $M_t = abs(X_t) + abs(Y_t) + abs(Z_t)$

Store $M_t$ into array: window

Calculate: $D_t = abs(M_t - M_{t-1})$

Store $D_t$ into array: diff_window

Calculate: decider=avg(diff_window) where diff_window={$D_1, D_2$ Š $D_t$}

Whenever decider>threshold_first, trigger first mode, whenever decider<threshold_second, trigger second mode, where Š refers to a series of the differences D.

Figure 2:
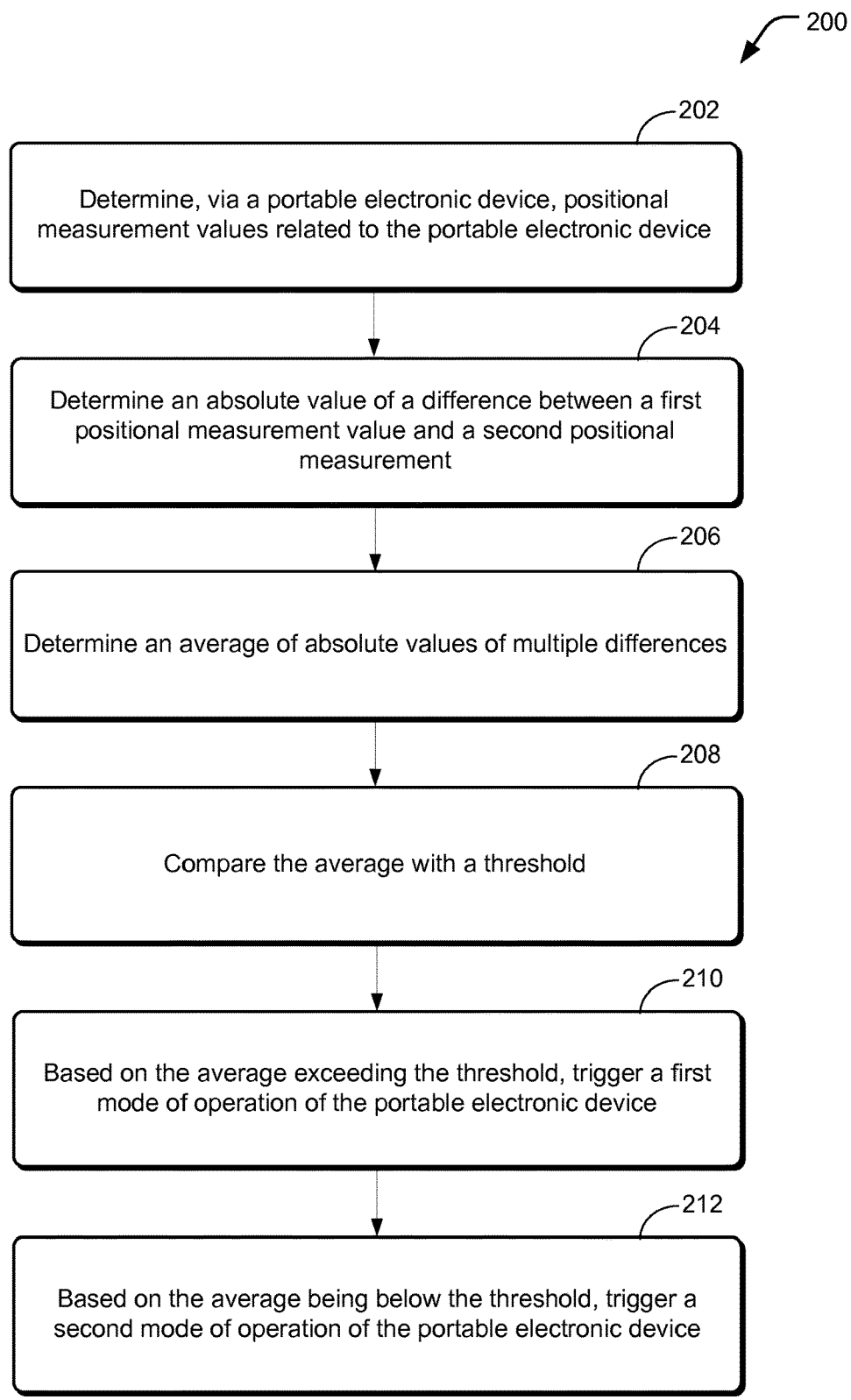
FIG. 2 is a flowchart illustrating an example of a process of determining a location or position of the portable electronic device of FIG. 1, in accordance with various embodiments.

FIG. 2 is a flowchart illustrating a process 200 of an example of a process of determining a location and/or position of a portable electronic device in order to control features and/or modes of operation of the portable electronic device, for example a portable electronic device as described in FIG. 1. At 202, positional measurement values related to the portable electronic device are determined via the portable electronic device. At 204, an absolute value of a difference between a first positional measurement value and a second positional measurement value is determined. At 206, an average of absolute values of multiple differences is determined. At 208, the average is compared with a threshold. At 210, based on the average exceeding the threshold, a first mode of operation of the portable electronic device is triggered. At 212, based on the average being below the threshold, a second mode of operation of the portable electronic device is triggered. In accordance with various embodiments, the mode of operations may include an active mode and a sleep or low power mode. Additionally, in accordance with various embodiments, the modes of operation may involve activating or deactivating various features of the electronic device such as, for example, auto-scrolling, displaying video content in high resolution or low resolution on a display of the portable electronic device, and displaying video content in a small view on the display or displaying video content in a large view or full view on the display.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A method of determining a location or a position of a portable electronic device that includes a gyroscope and a display, the method comprising:
    determining absolute values of individual gyroscope measurements;
    summing the absolute values of the individual gyroscope measurements to provide a measurement value;
    determining an absolute value of a difference between the measurement value and a previous measurement value that was determined prior to the measurement value;
    storing the absolute value of the difference within memory of the portable electronic device;
    determining an average of absolute values of multiple differences stored within the memory;
    based on the average being equal to or exceeding a first threshold, determining that the portable electronic device is located in a user's hand; and
    based on the average being below a second threshold, determining that the portable electronic device is located on a stable surface;
    based on a first determination that the portable electronic device is located in the user's hand, triggering a first mode of operation of the portable electronic device, wherein the first mode of operation comprises one or more of an active mode of operation, enabling an auto-scrolling feature, enabling a low-resolution mode feature of the display, disabling a high-resolution mode feature of the display, or disabling a full view mode feature of the display; and
    based on a second determination that the portable electronic device is located on the stable surface, triggering a second mode of operation, wherein the second mode of operation comprises one or more of a low power mode of operation, disabling the auto-scrolling feature, disabling the low-resolution mode feature of the display, enabling the high-resolution mode feature of the display, or enabling the full view mode feature of the display.

2. The method of claim 1, wherein the method further comprises:
    based on the first determination that the portable electronic device is located in the user's hand, enabling a feature of the portable electronic device; and
    based on the second determination that the portable electronic device is located on the stable surface, disabling the feature of the portable electronic device.

3. The method of claim 1, wherein the method further comprises:
    based on the first determination that the portable electronic device is located in the user's hand, disabling a feature of the portable electronic device; and
    based on the second determination that the portable electronic device is located on the stable surface, enabling the feature of the portable electronic device.

4. The method of claim 1, wherein triggering the first mode of operation of the portable electronic device comprises at least one of enabling one or more features of the portable electronic device or disabling one or more of features of the portable electronic device.

5. The method of claim 1, wherein triggering the second mode of operation of the portable electronic device comprises at least one of enabling one or more features of the portable electronic device or disabling one or more features of the portable electronic device.

6. A method comprising:
    determining, via a portable electronic device that includes a display, positional measurement values related to the portable electronic device;
    determining an absolute value of a difference between a first positional measurement value and a second positional measurement value of the positional measurement values;
    determining an average of absolute values of multiple differences of multiple positional measurement values;
    based on a first determination that the average is equal to or exceeds a threshold, triggering a first mode of operation of the portable electronic device, wherein the first mode of operation comprises one or more of an active mode of operation, enabling an auto-scrolling feature, enabling a low-resolution mode feature of the display, disabling a high-resolution mode feature of the display, or disabling a full view mode feature of the display; and based on a second determination that the average is below the threshold, triggering a second mode of operation of the portable electronic device, wherein the second mode of operation comprises one or more of a low power mode of operation, disabling the auto-scrolling feature, disabling the low-resolution mode feature of the display, enabling the high-resolution mode feature of the display, or enabling the full view mode feature of the display.

7. The method of claim 6, wherein triggering the first mode of operation of the portable electronic device comprises at least one of enabling one or more features of the portable electronic device or disabling one or more features of the portable electronic device.

8. The method of claim 6, wherein triggering the second mode of operation of the portable electronic device comprises at least one of enabling one or more features of the portable electronic device or disabling one or more features of the portable electronic device.

9. The method of claim 6, wherein determining the absolute value of the difference between the first positional measurement value and the second positional measurement value comprises determining the absolute value of the difference between the first-positional measurement value and the second positional measurement value, wherein the second positional measurement value was determined prior to determining the first positional measurement value.

10. The method of claim 6, wherein the method further comprises:
   comparing the average with the threshold comprises comparing the average with two thresholds;
   based on the average equaling or exceeding a first threshold of the two thresholds, triggering the first mode of operation; and
   based on the average being below a second threshold of the two thresholds, triggering the second mode of operation.

11. A portable electronic device comprising:
   a gyroscope;
   a display;
   a processor; and
   memory including logic stored therein that when executed by the processor causes the processor to:
   determine positional measurement values related to the portable electronic device, wherein the positional measurement values are based upon measurements obtained by the gyroscope;
   determine an absolute value of a difference between a first positional measurement value and a second positional measurement value of the positional measurement values;
   determine an average of absolute values of multiple differences of multiple positional measurement values;
   based on the average being equal to or exceeding a first threshold, determine that the portable electronic device is located in a user's hand; and
   based on the average being below a second threshold, determine that the portable electronic device is located on a stable surface;
   based on a first determination that the portable electronic device is located in the user's hand, trigger a first mode of operation of the portable electronic, wherein the first mode of operation comprises one or more of an active mode of operation, enabling an auto-scrolling feature, enabling a low-resolution mode feature of the display, disabling a high-resolution mode feature of the display, or disabling a full view mode feature of the display; and
   based on a second determination that the portable electronic device is located on the stable surface, trigger a second mode of operation, wherein the second mode of operation comprises one or more of a low power mode of operation, disabling the auto-scrolling feature, disabling the low-resolution mode feature of the display, enabling the high-resolution mode feature of the display, or enabling the full view mode feature of the display.

12. The portable electronic device of claim 11, wherein the logic further causes the processor to:
   based on the first determination that the portable electronic device is located in the user's hand, display content on the display of the portable electronic device in at least one of (i) the low resolution mode feature of the display or (ii) a small view mode feature of the display; and
   based on the second determination that the portable electronic device is located on the stable surface, display content on the display of the portable electronic device in at least one of (i) the high resolution mode feature of the display or (ii) the full view mode feature of the display.

13. The portable electronic device of claim 11, wherein the logic further causes the processor to:
   based on the first determination that the portable electronic device is located in the user's hand, enable the auto-scrolling feature on the portable electronic device; and
   based on the second determination that the portable electronic device is located on stable surface, disable the auto-scrolling feature on the portable electronic device.

14. The portable electronic device of claim 11, wherein the positional measurement values are based upon measurements obtained by the gyroscope, and wherein the logic causes the processor to determine each positional measurement value related to the portable electronic device by:
   determining absolute values of individual gyroscope measurements; and
   summing the absolute values of the individual gyroscope measurements to provide each positional measurement value.

15. The portable electronic device of claim 11, wherein the logic causes the processor to determine the absolute value of a difference between the first positional measurement value and the second positional measurement value, wherein the second positional measurement value was determined prior to determining the first positional measurement value.

16. A non-transitory computer storage media having computer readable instructions stored thereon, the computer readable instructions being executable by a processor to cause the processor to:
   determine positional measurement values related to a portable electronic device that includes a display;
   determine an absolute value of a difference between a first positional measurement value and a second positional measurement value of the positional measurement values;
   determine an average of absolute values of multiple differences of multiple positional measurement values;

based on the average equaling or exceeding a first threshold, determine that the portable electronic device is located in a user's hand; and based on the average being below a second threshold, determine that the portable electronic device is located on a stable surface;

based on a first determination that the portable electronic device is located in the user's hand, trigger a first mode of operation of the portable electronic, wherein the first mode of operation comprises one or more of an active mode of operation, enabling an auto-scrolling feature, enabling a low-resolution mode feature of the display, disabling a high-resolution mode feature of the display, or disabling a full view mode feature of the display; and based on a second determination that the portable electronic device is located on the stable surface, trigger a second mode of operation, wherein the second mode of operation comprises one or more of a low power mode of operation, disabling the auto-scrolling feature, disabling the low-resolution mode feature of the display, enabling the high-resolution mode feature of the display, or enabling the full view mode feature of the display.

17. The non-transitory computer storage media of claim 16, wherein the computer readable instructions further cause the processor to:

based on the first determination that the portable electronic device is located in the user's hand, enable one or more features of the portable electronic device; and based on the second determination that the portable electronic device is located on the stable surface, disable the one or more features of the portable electronic device.

18. The non-transitory computer storage media of claim 16, wherein the computer readable instructions further cause the processor to:

based on the first determination that the portable electronic device is located in the user's hand, disable one or more features of the portable electronic device; and based on the second determination that the portable electronic device is located on the stable surface, enable the one or more features of the portable electronic device.

19. The non-transitory computer storage media of claim 16, wherein the positional measurement values are based upon measurements obtained by a gyroscope, and wherein the computer readable instructions cause the processor to determine each positional measurement value related to the portable electronic device by:

determining absolute values of individual gyroscope measurements; and summing the absolute values of the individual gyroscope measurements to provide each positional measurement value.

20. The non-transitory computer storage media of claim 16, wherein the second positional measurement value was determined prior to determining the first positional measurement value.

* * * * *